E. INGHAM.
METHOD OF AND MEANS FOR WEAVING CIRCULAR FABRICS.
APPLICATION FILED FEB. 27, 1919.
1,438,916.
Patented Dec. 12, 1922.
7 SHEETS—SHEET 1.
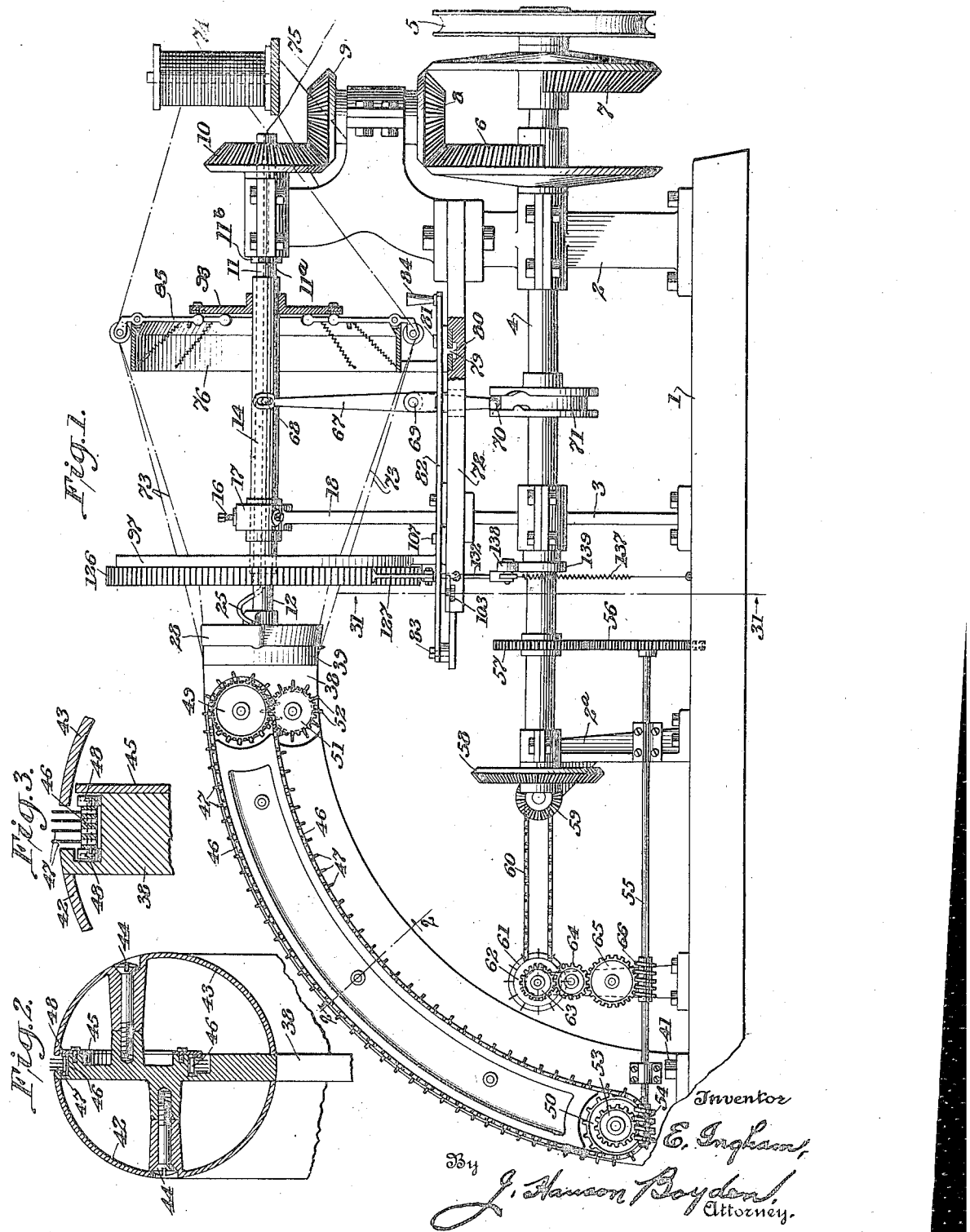

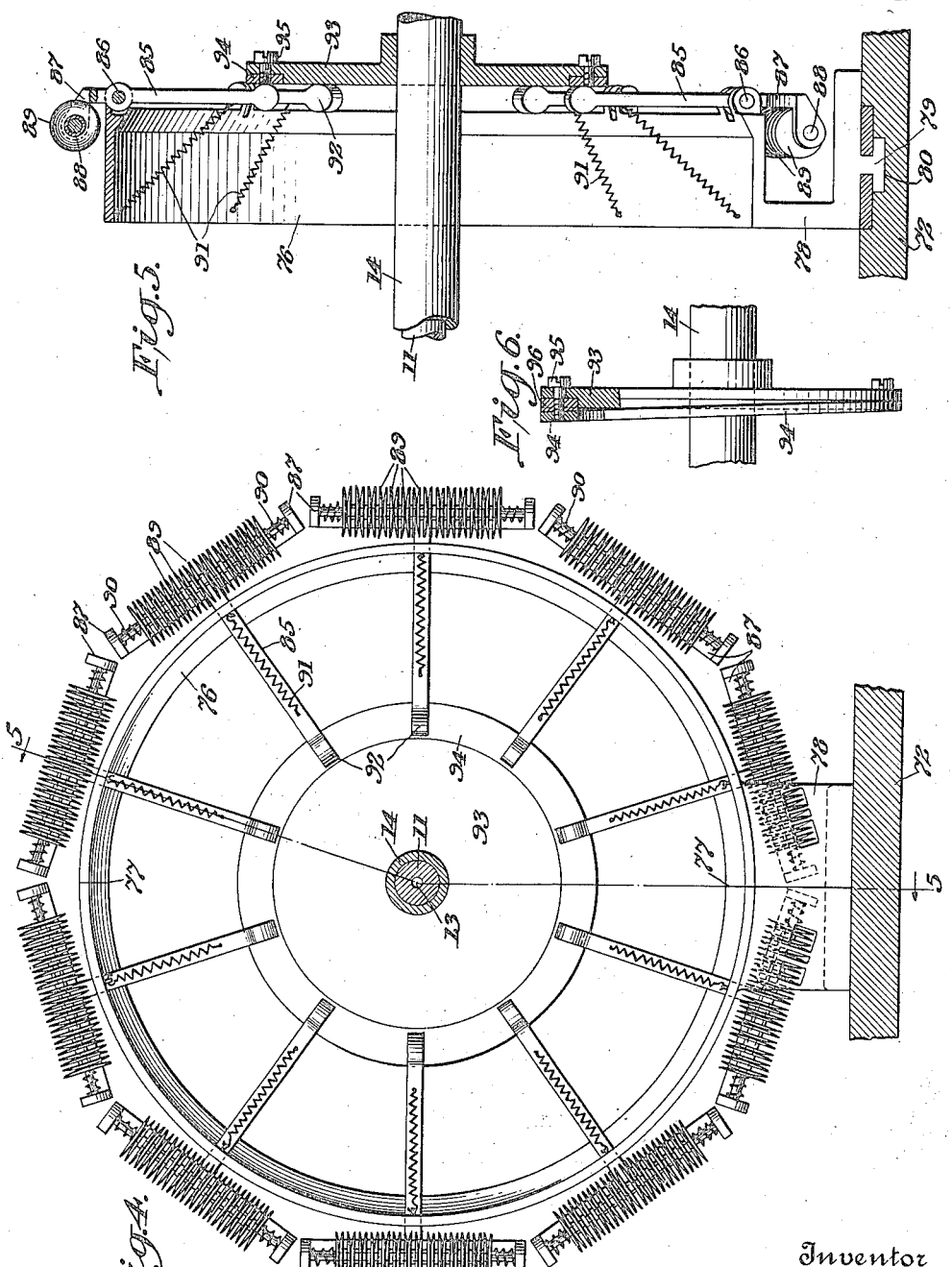

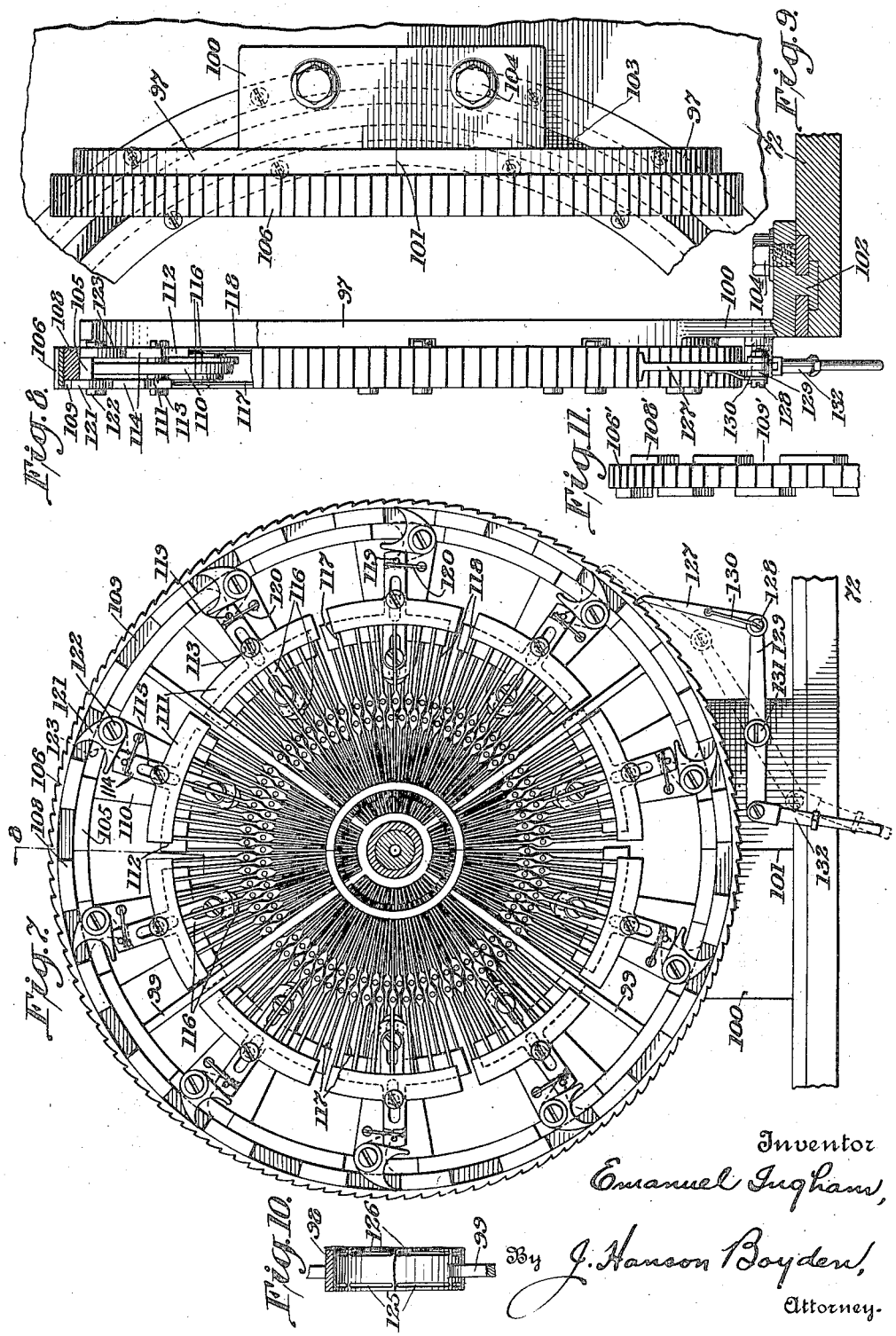

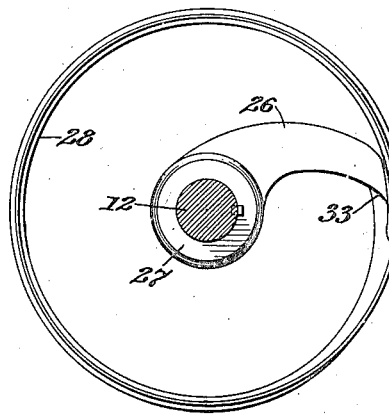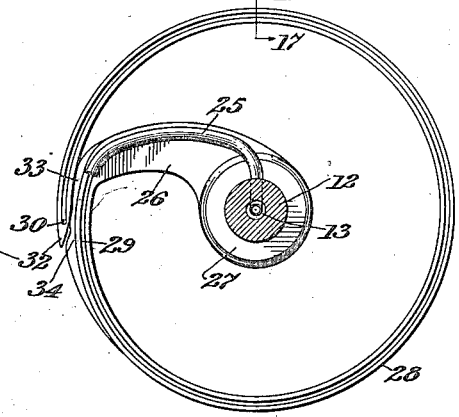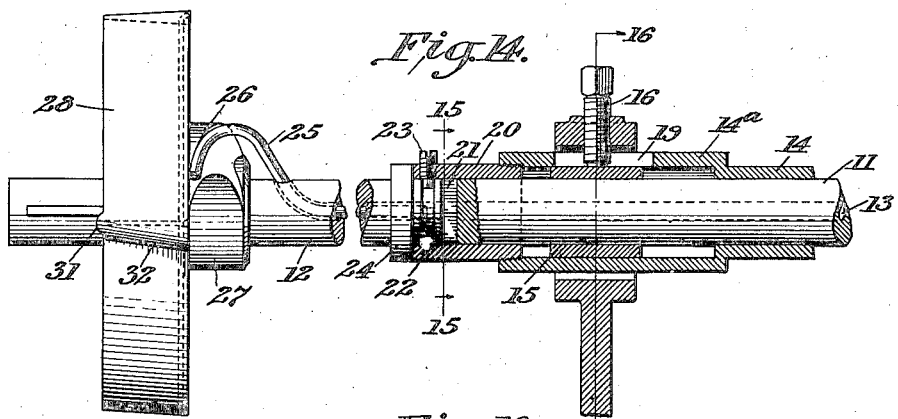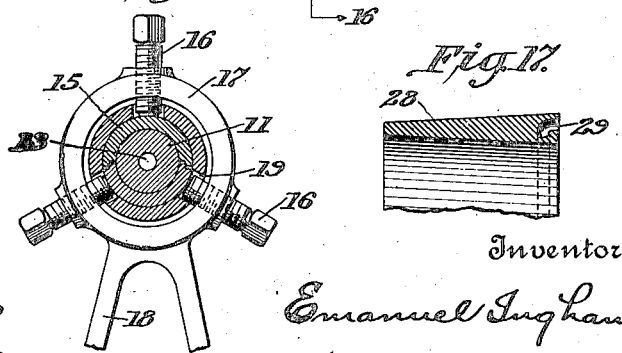

E. INGHAM.
METHOD OF AND MEANS FOR WEAVING CIRCULAR FABRICS.
APPLICATION FILED FEB. 27, 1919.
1,438,916.
Patented Dec. 12, 1922.
7 SHEETS—SHEET 5.
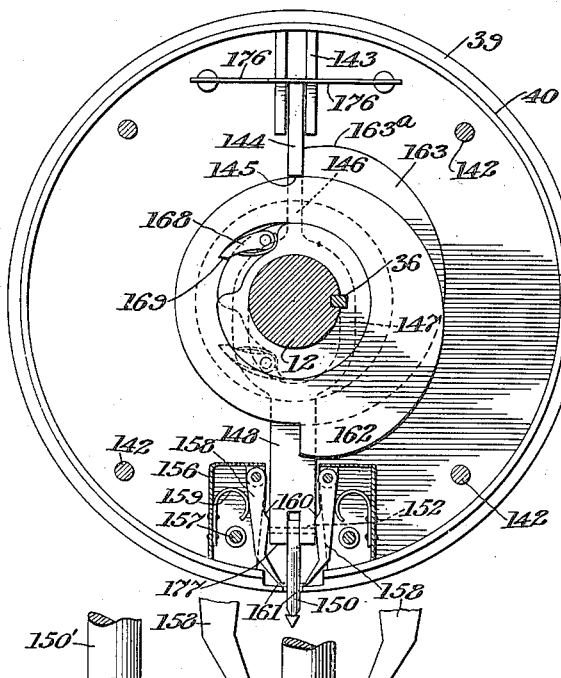
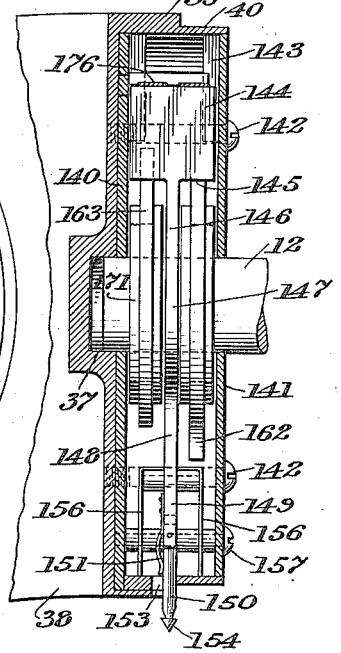
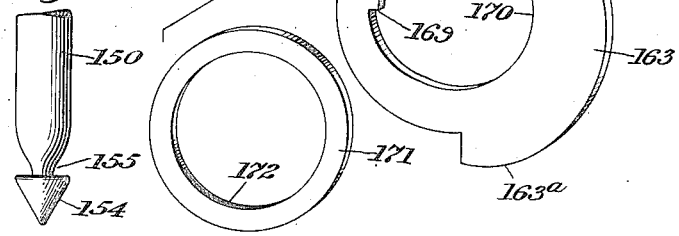
Inventor
Emanuel Ingham,
By J. Hanson Boyden,
Attorney.

E. INGHAM.
METHOD OF AND MEANS FOR WEAVING CIRCULAR FABRICS.
APPLICATION FILED FEB. 27, 1919.

1,438,916.

Patented Dec. 12, 1922.

Inventor
Emanuel Ingham,
By J. Hanson Boyden,
Attorney.

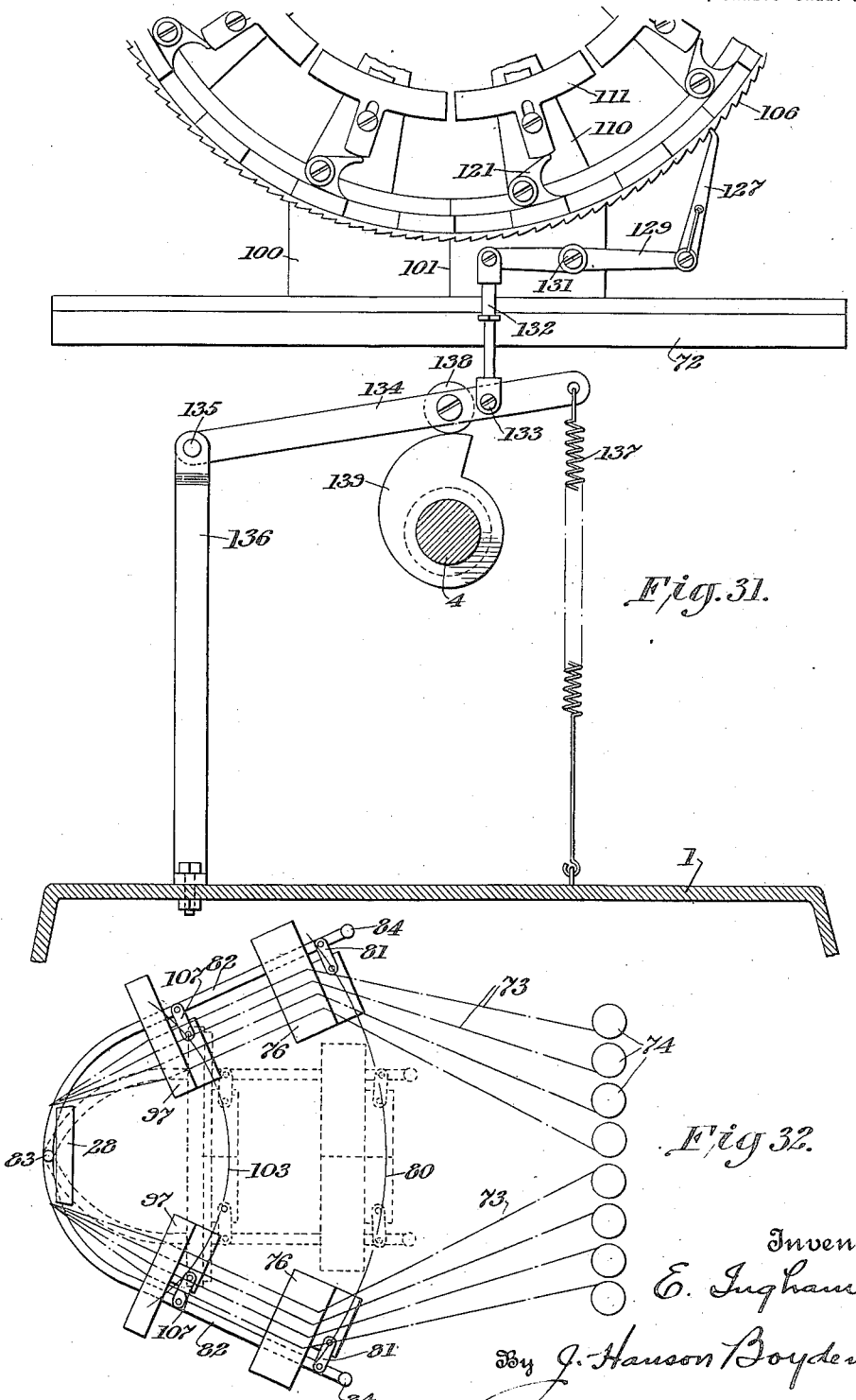

Patented Dec. 12, 1922.

1,438,916

UNITED STATES PATENT OFFICE.

EMANUEL INGHAM, OF SAN DIEGO, CALIFORNIA.

METHOD OF AND MEANS FOR WEAVING CIRCULAR FABRICS.

Application filed February 27, 1919. Serial No. 279,511.

*To all whom it may concern:*

Be it known that I, EMANUEL INGHAM, a subject of the King of Great Britain, and resident of San Diego, county of San Diego, State of California, have invented a new and useful Improvement in Methods of and Means for Weaving Circular Fabrics, of which the following is a specification.

This invention relates to a method of and machine for weaving curved, tubular, or circular fabrics, and has special utility when applied to the production of a U-shaped fabric suitable for forming the foundation for pneumatic tire casings.

The present invention is in the nature of an improvement on or further development of my prior Patent No. 1,328,794, dated Jan. 20, 1920, and embodies a number of new and important features.

In the present machine, substantially the same type of circular oscillating needle covered by my said prior application has been retained, but I have now provided new instrumentalities cooperating with said needle in such a way that the loops formed at the adjacent edges of the U-shaped fabric are interlocked, during the process of weaving, so as to produce a complete tubular structure. Such a tubular fabric may be utilized as it is, in various arts, or it may be split so as to assume a U-shaped character again.

In the apparatus of my prior patent, an arc-shaped support was arranged to receive the fabric as it came from the weaving mechanism, such support being fixed at a point adjacent such weaving mechanism, and a pivoted form was provided to feed the fabric along such support. In the present improvements I have devised an arcuate form or standard to receive the fabric, such form being supported at its end remote from the fabric producing mechanism, and I have provided a flexible element traveling longitudinally of the peripheral surface of the form or standard, and serving to feed the finished fabric therealong, as it is produced.

The present invention also contemplates improved heddle and tension mechanisms, and novel means for supporting and shifting said mechanisms, whereby ready access may be had to the needle for inspection or removal without interfering with the warp threads.

To carry out the above and other ideas, and to improve generally the structural details and ease of operation of circular looms of this type, my invention consists in the construction and arrangement of parts hereinafter described and claimed, and illustrated, by way of example, in the accompanying drawings, in which:—

Figure 1 is a side elevation illustrating the complete machine, parts being in section;

Figure 2 is a transverse section on an enlarged scale on the line 2—2 of Figure 1;

Figure 3 is a still further enlarged fragmentary detail of the upper part of Figure 2;

Figure 4 is a front elevation of my improved tension mechanism;

Figure 5 is a transverse section thereof, substantially on the line 5—5 of Figure 4;

Figure 6 is a sectional side elevation of a modified construction of one of the parts shown in Figure 5;

Figure 7 is a front elevation of my improved heddle mechanism;

Figure 8 is a sectional side elevation thereof, the upper part being in section on the line 8 of Figure 7;

Figure 9 is a plan view of the heddle mechanism showing the curved slot or track in which it is supported;

Figure 10 is a transverse section through the central supporting ring of the heddle mechanism;

Figure 11 is a fragmentary side elevation of the heddle mechanism showing a slightly modified construction;

Figures 12 and 13 are front and rear elevations respectively of the oscillatory needle, the supporting shaft being in section;

Figure 14 is a side view partly in elevation and partly in section showing the means for supporting the needle shaft;

Figure 15 is a transverse section substantially on the line 15—15 of Figure 14;

Figure 16 is a transverse section substantially on the line 16—16 of Figure 14;

Figure 17 is a transverse section on an enlarged scale on the line 17—17 of Figure 13;

Figure 18 is a similar transverse section through the eye portion of the needle;

Figure 19 is a front elevation of the mechanism for operating my novel looping hook, the front wall of the casing being removed;

Figure 20 is a substantially central transversely vertical section thereof;

Figure 21 is a perspective view of separated parts of one of the cam mechanisms shown in Figures 19 and 20;

Figure 22 is an enlarged detail view of the looping hook;

Figures 23 and 24 are front and side elevations respectively of a slightly modified form of such hook;

Figure 28:
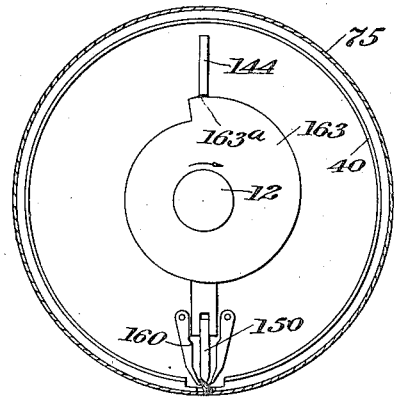
Figure 29:
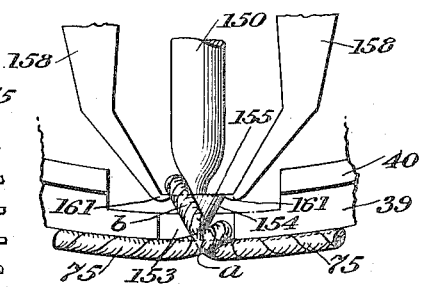
Figure 30:
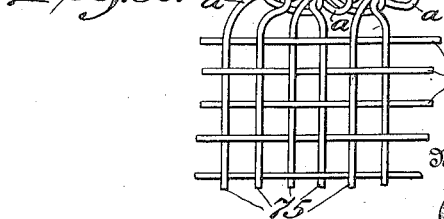

Figure 24 also shows the cooperating detents hereinafter described;

Figures 25, 26, 27 and 28 are more or less diagrammatic views showing different positions of the cam and hook mechanism, and illustrating various steps in the formation of the loops;

Figure 29 is a very much enlarged detail of the hook and catch devices illustrating the parts in the position in which they occupy in Figure 28;

Figure 30 is a diagrammatic view showing the way in which the marginal loops are interlocked to form a tubular fabric;

Figure 31 is an enlarged sectional elevation substantially on the line 31—31 of Figure 1 illustrating the operating device for the heddle mechanism; and Figure 32 is a diagrammatic plan view illustrating the way in which the tension and heddle mechanisms can be shifted in order to afford access to the needle.

Referring to the drawings in detail which illustrate one embodiment of the invention, 1 designates a suitable base on which frames or pedestals 2 and 3 are secured. A main shaft 4 is journaled in bearings carried by said pedestals and carries at one end a driving pulley 5 and a pair of oppositely disposed beveled gears 6 and 7. These gears mesh with a bevel pinion 8 secured at the lower end of a short vertical shaft, to the upper end of which is attached a second bevel pinion 9. This meshes with a bevel gear 10 on the needle shaft. This needle shaft is composed of two sections 11 and 12, the gear 10 being attached to the end of section 11 and the needle being secured to the section 12. Through the center of the section 11 of the shaft extends a bore 13 forming a conduit for the weft thread, as will more fully hereinafter appear.

Working freely over the shaft 11 is a sleeve 14, having an enlarged portion 14ª enclosing bearing members 15 in which the shaft 11 is journaled. These bearing members are supported in a circular frame 17 carried by a standard 18 which is preferably bifurcated, as shown in Figure 16. The bearing members 15 are held by three set screws 16 working in the circular frame 17 and extending through slots 19 in the enlarged portion 14ª of the sleeve 14. By virtue of this construction it will be seen that both the sleeve 14 and the channel section 11 are free to move axially through the supporting ring 17 and bearing 15 carried thereby.

The forward end of the sleeve 14 receives a short auxiliary sleeve or nipple 20 which snugly fits the shaft 11. Within this auxiliary sleeve the shaft 11 terminates and is formed at its end with a transverse socket or mortise which is adapted to receive a complementary tenon 21 formed on the end of the shaft section 12. The end of such section adjacent the tenon 21 is also provided with an annular groove 22 in which works the point of a set screw 23 carried by the auxiliary sleeve 20. The end of such sleeve abuts snugly against a collar 24 secured to the shaft section 12. As a result of such construction it will be apparent that the shaft section 12 is capable of rotation relative to the sleeves 14 and 20, but is locked rigidly to the shaft section 11, so far as angular movements are concerned. It will be seen, however, that the shaft sections 11 and 12 may be uncoupled by relative axial movement, such movement being permitted by removing the set screw 23, if it is desired to withdraw the shaft section 12. The shaft section 11 may, however, be withdrawn axially by loosening the set screw 11ª (see Figure 1) which secures the collar 11ᵇ upon the shaft adjacent its rear bearing, it being understood that the gear 10 is splined to the shaft 11 so that the latter may slip freely through the same. As a further result of the construction above described and shown in Figures 14 and 16, it will be noted that the shaft section 12 is coupled to the sleeves 14 and 20 so as to be compelled to move axially therewith in both directions.

A tubular guide 25 for the weft thread is disposed with one end entering a central bore in the shaft section 12 forming a continuation of the bore 13, and with its other end protruding from such shaft and projecting in a radial direction toward the periphery of the needle. (See Figures 13 and 14.)

The needle comprises a hub 27 rigidly secured to the shaft 12, a radial arm 26, and a circumferential portion or body 28. This body has a peripheral groove or thread guide 29 which extends from the outer end of the tubular guide 25 to the point of the needle. It will be understood that this peripheral groove 29 is formed in the rear edge of the needle, which edge, as indicated in Figures 17 and 18, is of greater thickness than the forward edge, the body of the needle being wedge shaped in cross section. Adjacent the point 32, which is relatively thin and sharp, the needle is provided with a transverse thread delivery eye 30 which communicates with the peripheral groove 29, as clearly shown in Figure 18. It will be further observed that this groove 29 is preferably slightly undercut, as shown in Figures 17 and 18, for the purpose of better retaining the thread therein. At the point where the thread leaves the delivery end of the eye 30 the edge of the needle is provided with a slight projection 31, as shown in Figures 14 and 18 and as fully described in my above mentioned prior application.

By reference to Figures 12 and 13, it will be noted that the point of the needle somewhat overlaps the heel 33 thereof, or in other words the body of the needle extends over more than 360°, to that extent constituting a spiral, and a gap 34 between the point and the heel is provided, through which the warp threads may pass.

The shaft 12 is mounted at its forward end in suitable bearings 37 formed at the upper end of a curved form or standard 38 secured to the base 1 as by means of bolts 41. Surrounding the bearing 37 is a circular form or ring 39 of the same diameter as the standard 38 and having its outer edge cut away, as indicated at 40, to form a needle receiving groove. In other words, the portion 40 of the ring or form 39 is of slightly reduced diameter so as to fit within the needle.

The form or standard 38 is made up of a central frame or casting as shown in Figure 2, and a pair of curved shells 42 and 43, the two shells and casting, together with the ring 39 forming an arcuate structure substantially circular in cross-section. The shells 42 and 43 may be secured in position by means of screws 44. By means of suitable grooves formed in the casting 38 and with the assistance of one or more plates 45, a raceway for an endless chain 46 or the like is provided throughout the length of the standard. As shown in Figure 3, such chain comprises links 46 carrying upstanding pins 47 which project through a slot formed in the outer curved surface of the standard. To the ends of the pivot pins by means of which the links are connected are secured anti-friction rollers 48 which run in the above-mentioned raceway. It will of course be understood that any other suitable construction of chain or band may be employed, the only essential thing being that there shall be provided a continuous flexible element traveling along the outer surface or periphery of the arcuate form or standard 38, and preferably having a series of pins or the like projecting up through a longitudinal slot formed in such surface so as to feed the fabric as hereinafter described.

The chain 46 passes around a sprocket wheel 49 at the upper end of the standard, which wheel carries a gear meshing with a second gear 51 preferably provided with pins 52 which project beyond the lower surface of the standard and serve to engage and feed the fabric at that point. At the bottom of the standard the chain passes around a sprocket wheel 50 which carries a worm wheel 53 meshing with a worm 54 by means of which the sprocket chain is driven. The worm 54 is mounted on a shaft 55 carrying at one end a gear 56 meshing with the gear 57 secured to the shaft 4. This shaft also carries a bevel gear 58 meshing with a bevel pinion 59 carrying a sprocket wheel around which passes a sprocket chain 60 which drives a cutter disk 61 disposed adjacent to the standard 38 for a purpose hereinafter described. At each side of the cutter disk 61 is preferably mounted a second feed wheel 62, having projecting pins adapted to engage the fabric. This carries and is driven by a pinion 63 meshing with a pinion 64 which in turn engages a gear 65 which is in engagement with a worm 66 mounted on the shaft 55.

A lever 67 is pivoted at 69 to a fixed support and has a slot at its upper end engaging a pin 68 carried by the sleeve 14. The lower end of the lever 67 is preferably provided with a ball or other anti-friction device 70 which is in engagement with a cam groove formed in the periphery of a cam 71 secured to the shaft 4.

A platform 72 is supported by the pedestals 2 and 3 and serves to carry the tension and heddle mechanism hereinafter described. The warp threads are designated by the reference numeral 73 and are fed from fixed spools or rolls 74, while the weft thread is indicated at 75 and enters the rear end of the bore 13 in the shaft 11, as shown in Figure 1. It also is fed over a fixed spool of roll (not shown).

My improved tension mechanism which I prefer to employ is shown in detail in Figures 4, 5 and 6 of the drawing. Referring to these figures it will be seen that the tension mechanism comprises a circular frame or ring 76 divided on a central vertical plane into two similar halves, or sections, as indicated at 77. Each of these sections is supported upon a pedestal 78 having a foot or extension 79 which is slidable in a curved slot or groove 80 formed in the table 72.

Pivotally mounted around the ring 76, at the rear side thereof is a series of radially extending levers 85 pivoted at 86 and constructed with a rule joint which limits the movement of such levers in a counter clockwise direction to the position shown in Figure 5. Each lever 85 carries a bracket 87 projecting beyond the periphery of the ring 76 and such bracket supports a shaft or rod 88 on which are slidably mounted a series of concavo-convex tension disks 89. These disks are urged together by means of compression springs 90 coiled around the rod 88 at each end thereof and causing the disks to be held together in a compact group as clearly shown in Figure 4. It will be understood that a warp thread is received between the convex surfaces of each pair of tension disks, after the manner of the familiar tension device used upon sewing machines.

Any desired number of levers, brackets and disks may be employed but in the drawings I have shown ten levers and brackets, each carrying fourteen pairs of disks, thus providing for one hundred and forty warp threads.

Helical springs 91 are attached at one end to the forward edge of the ring 76 and at the other end to the inner ends of the levers 85 and therefore tend to rotate such levers in a clockwise direction.

The inner ends of the levers 85 are preferably provided with rounded enlargements 92, and these engage and bear against a bearing ring 94 secured by means of screws 95 to a disk 93 rigidly mounted upon the sleeve 14. From the above it will be seen that when the sleeve 14 is reciprocated, as hereinafter described, the levers 85 will be swung on their pivots in a clockwise direction, the plate 93 serving to move the levers in the same direction in which the springs 91 tend to move them. This movement is opposed by the tension of the warp threads, as will hereinafter appear.

In weaving a fabric which is curved longitudinally as herein described, it is desirable that the tension levers adjacent the outer periphery of said fabric be actuated to a greater extent than those adjacent the inner or heel portion thereof. To this end I may provide spacing blocks or shim plates 96 interposed between the bearing ring 94 and the plate 93 so that the bearing ring may be set at an angle to the plate 93, as shown in Figure 6. In this case the upper levers 85, as viewed in Figure 5, can be advanced further than the lower or laterally extending levers.

My improved heddle mechanism is shown in detail in Figures 7 to 11 inclusive. Referring to these figures, it will be seen that this mechanism also includes a circular frame or ring 97 and an inner ring or frame 98, both of said rings being divided on a central vertical plane to form two similar halves or sections. The line of division is indicated at 101 in Figure 7.

The inner and outer rings 97 and 98 are rigidly united by means of radial spokes or arms 99 and each section is supported upon a pedestal or base 100 which has a projecting portion or foot 102 slidably mounted in a curved undercut slot or guideway 103 formed in the table 72. The sections of the heddle frame may be held in adjusted position by means of clamping screws 104.

Referring more particularly to Figures 7 and 8, the forward edge of the ring 97 is provided with a series of notches or slots having interposed teeth or projections 105, and in each notch or slot is pivotally mounted a pair of swinging dogs 121 and 123 carried on pivot screws 122. Projecting radially inward from the ring 97 and disposed centrally between the pairs of pivoted dogs 121 is a plurality of fixed brackets 110, one being disposed adjacent each pair of dogs. Slidably mounted on each face of each bracket 110 is a pair of segments 111 and 112, each provided with inner and outer projections 114 and 116, such projections having radial slots 115 which work loosely upon screws 113.

The front and rear segments 111 and 112 have rigidly secured thereto the outer ends of front and rear sets of heddle rods or wires 117 and 118 respectively. The segments are resiliently urged outwardly by means of leaf springs 120 working against pins 119 carried by the extensions 114 of said segments.

The inner ends of the front and rear groups of heddle rods are loosely received in slots 125, 126 respectively formed in the inner supporting ring 98. It will be understood that these heddle rods are provided intermediate their ends with the usual thread receiving eyes and that they are capable of freely reciprocating through the slots 125 and 126.

In order to reciprocate these heddle rods I provide a ring 108 rotatably mounted outside of the ring 97 and having slots or notches 109 cut therethrough at the edges thereof. These slots or notches form teeth or projections between them and it will be understood that the teeth and notches alternate on opposite sides of the ring. That is to say, a notch on one side is directly opposite a tooth or projection on the other side. The swinging dogs 121 bear against the outer ends of the projections 114 and are also urged outwardly against the inner side of the notched ring, by reason of the springs 120. It will be seen therefore that as the ring 108 is rotated the notches and teeth are caused to pass successively over the swinging dogs 121 with the result that such dogs are swung on their pivots and move the corresponding segments 111 and 112 and their associated heddle rods, radially inwardly and outwardly. It will further be understood that the front and rear segments 111 and 112 of each set of heddle rods are shifted alternately, by virtue of the alternate arrangement of the notches 109. That is to say, when the front segment 111 is in its outermost position, the rear segment 112 will be in its innermost position, and vice versa.

In order to rotate the ring 108 as described, I have provided a ratchet band 106 surrounding and secured to the ring 108, and this ratchet band is adapted to be engaged and operated by means of a pawl 127 pivoted at 128 to the end of an oscillating lever 129, a spring 130 being provided for yieldingly holding the pawl 127 in engagement with the teeth of the ratchet band. The lever 129 is pivoted at 131 to the pedestal 100 and its other end is connected by means of a link 132 to a second lever 134 (see Figure 31) pivoted at 135 to a fixed support 136 secured to the base 1. The link 132 is connected to the lever 134 near its free end by means of a pivot 133 and the lever 134 carries an anti-friction roller 138 which engages a cam 139 rigidly mounted upon the shaft 4. A helical spring 137 extends between the end of lever 134 and a fixed support, such as the base 1, and tends to urge said lever downwardly. It will therefore be seen that when the shaft 4 rotates the pawl 127 is reciprocated to actuate the ratchet band 106 and the associated heddle mechanism. It will be understood that the stroke of the pawl 127 is so regulated that the ring 108 will be shifted, at each actuation, a distance exactly equal to the length of one of the slots or notches 109.

As will be readily comprehended, the warp threads are led from a fixed release 74 through the tension and heddle mechanisms to the needle 28 and form 39, as shown in Figure 1, such warp threads entirely, or at least substantially, enclosing said needle and form. The purpose of making the heddle and tension mechanisms in two halves or sections, as above described, is to enable the warp threads to be divided so as to afford access to the needle for inspection or removal. Referring to Figures 1 and 32, I have diagrammatically illustrated how this may be accomplished. Levers 82 are pivoted at 83 to a fixed support and are provided at their free ends with operating handles 84. These levers are connected, as by means of links 81 and 107 with the sections of the tension and heddle mechanisms designated by 76 and 97 respectively. The reference numerals 80 and 103 in Figure 32 designate conventionally the curved slots in which the pedestals of the tension and heddle mechanisms respectively slide. The normal positions of the parts is indicated by dotted lines in Figure 32. When it is desired to separate or open up the warp threads so as to obtain access to the needle, the ring 106 is first removed from the heddle mechanism, and the levers 82 are swung outwardly toward the full line position in Figure 32, each lever carrying with it one section of the tension and heddle mechanisms. The result is that the warp threads 73 are divided into two groups, thus forming a clearance at the center through which access may be had to the needle. Owing to the fact that the curved slots 80 and 103 are struck on an arc having the pivot 83 for a center, the radial distance between the tension and heddle mechanisms remains constant during such shifting movement as has been described and therefore there is no slipping or pulling of the warp threads between these two mechanisms. In this way the proper tension or feeding of the threads is not interfered with and when the parts are returned to normal position, the weaving operation can be resumed without the necessity of re-arranging or re-adjusting the machine.

The operation of the machine as a whole, except so far as above described, is substantially the same as that of the machine covered by my prior copending application. In the present invention, however, I provide means for linking together the loops of weft thread formed at the adjacent edges of the curved fabric so as to produce a complete tubular structure. The mechanism by which this is accomplished is shown in detail in Figures 19 to 29 inclusive and will now be described.

Referring to these figures, 140 and 141 designate two circular plates which are held together by means of suitably shouldered screws 142 so as to form a kind of frame or casing in which the looping mechanism is enclosed. This casing, with its contained mechanism fits within the circular form 39. On the inside of the plates 140 and 141 near their upper edge are provided a pair of vertical guides 143 and between such guides is adapted to slide a cross head 144 having a pair of shoulders 145 and a depending yoke 146. This yoke comprises an elongated loop or slot 147 which fits over the shaft 12 and carries a shank 148 to the lower end 149, of which is secured by means of a pivot 152 a looping hook 150. A leaf spring 151 is secured to the shank 148 and bears against the rear side of the hook 150 so as to hold it firmly against the front wall of an opening 153 through which it extends. The end of the hook 150 may be cone-shaped, as indicated at 154, the point and edges being preferably rounded, and the shank being reduced adjacent the head so as to form a notch or groove 155 adapted to receive the thread. It will be understood that the depth of this groove depends upon the size of the thread employed.

Instead of employing a hook with a true cone-shaped head, as shown in Figure 22, a modified form of hook 150', shown in Figures 23 and 24, may be employed. In the construction shown in these figures opposite sides of the hook are cut away or flattened, as indicated at 174, and the head is shaped so as to form shoulders or barbs 175 for engaging the thread.

Within the casing 140—141 is disposed an auxiliary casing 156 preferably formed of two separable halves held together by means of screws 157. The end portion 149 of the shank 148 is received within the casing 156 and passes freely through a slot in the top thereof. Pivotally mounted within the casing 156 and arranged, when at each side of the shank 148 is a pair of swinging catches or detents 158, and these are urged yieldingly toward and against the edges of the shank 148 by means of bow-springs 159. The catches 158 are provided on their inner edges with rounded cam shoulders 160, and these are adapted to be engaged by the lower edge or corners 177 of the shank 148. The catches or detents 158 project inwardly at their lower ends into proximity to the hook 150 and that tips are turned sharply inward, as shown at 161 in Figure 24, to form thread engaging hooks.

Operatively connected with the shaft 12 and mounted inside of the casing 140—141 on either side of the yoke 147 is a pair of hook operating cams 162, 163. Each of these cams is similar in construction and has the same operative connection with the shaft. A description of one will therefore suffice for both. Referring to Figure 21, each cam, such as 163, is rotatably mounted on a boss 164 secured to an annular plate 166, the boss and plate having a keyway 165 adapted to engage the key 36 so as to be rigidly coupled to the shaft 12. The boss 164 has a recess 167 formed in one side thereof and in this recess is pivotally mounted a spring pressed pawl 168. This pawl is adapted to engage a shoulder 169 formed in the inner wall of the central opening 170 of the cam 163. The cam is retained in assembled relation on the boss 164 by means of a ring 171 having internal screw threads 172 adapted to engage similar threads 173 formed on the boss. It will be understood that the cams 162 and 163 are similar but that they are oppositely disposed and that the pawls 168 face in opposite directions. As a result of this construction it will be seen that the cam 162 will be moved when the shaft 12 rotates in one direction and the cam 163 will be moved when such shaft rotates in the opposite direction. Since the shaft 12 in operation is given an oscillatory movement, it will be apparent that first one cam and then the other is moved, each cam coming to rest and remaining idle during the time that the shaft makes the return stroke. It will be noted that the highest portion of each cam is at a point such as indicated by 163ª, slightly removed from the step or shoulder of the cam. The cams 162 and 163 are adapted to engage under the shoulders 145 of the cross head 144 and such cross head is yieldingly urged toward the cams by means of a pair of rivet springs 176.

The operation of the machine as a whole including the loop forming and interlocking mechanism will now be described. Warp threads from the spool 74 are led through the tension device and through the heddle mechanism, as shown in Figure 1, and are suitably engaged with the pins 47 and 52 on the feed chain and wheel respectively. The machine being driven through the power pulley 5, the needle 28 is given an oscillatory movement. In this connection it will be noted that the gears 8, 9 and 10 are so proportioned that the needle is moved through an angle somewhat greater than 360° at each oscillation. This is for the purpose of carrying the weft thread well past the loop forming hook 150 so that the thread may be easily thrown around the same.

The heddle mechanism is operated by means of the cam 139, as above described, with the result that the two sets of heddle rods are moved alternately inwardly and outwardly radially, thus forming a circular shed into which the needle 28 enters and lays the weft back and forth as will be obvious. After each oscillation of the needle the sleeve 14 is given an axial movement by means of the cam 71 and lever 67, thus driving the needle up into the fell of the fabric and beating up the weft. It will be noted that the needle 28 is moved positively in both directions by the aforesaid cam 71, such positive movement being possibly by reason of the pin and groove connection 22, 23, (see Figure 14) between the sleeve and needle shaft. At each reciprocation of the sleeve 14 the plate 93 is brought forcibly against the inner ends of the levers 85, thus exerting a strong backward pull on the warp threads at the moment that the needle moves forwardly to perform the beating up function. The pull on the threads between the needle and the tension mechanism due to the feeding forward of the fabric by means of the chain 46 maintains the inner ends of lever 85 in engagement with the plate 93 and swings the outer ends of such levers as far forwardly as possible. Thus the warp threads are always maintained taut and in proper working condition. As is obvious, sufficient thread slips through the tension devices at each stroke to compensate for the forward travel of the fabric.

It will be understood that when it is desired to remove the needle for any reason, the sections of the heddle and tension mechanisms are separated, as illustrated in Figure 32, so as to divide the warp and leave a clearance in the center. As above explained such shifting does not interfere with the proper tension of the threads. The needle, together with its attached shaft section 12 can be removed by loosening the set screw 11ª (see Figure 1) and slipping the shaft 11 rearwardly sufficient to permit the end of shaft 12 to clear the journal box or bearing 37 (see Figure 20). Upon taking out the screw 23 the mortise and tenon connection 21 (see Figure 14) can be separated and the shaft 12 with the needle, bodily removed.

Figure 25:
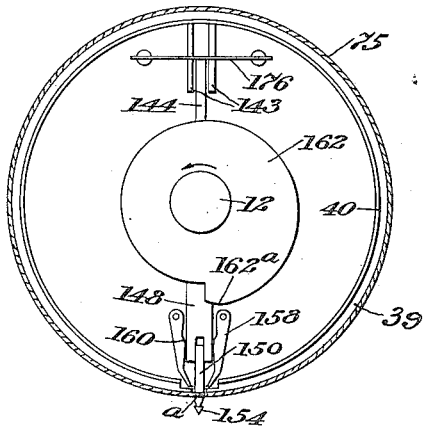
Figure 26:
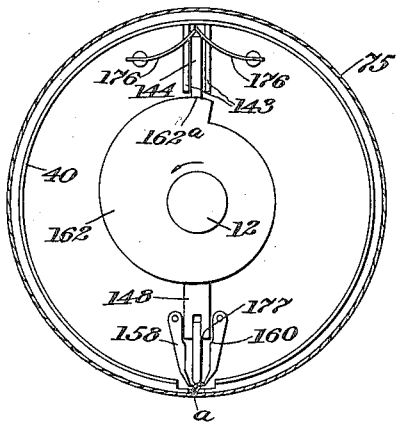
Figure 27:
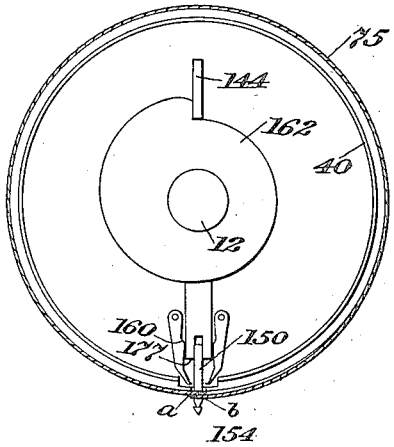

The weft thread is indicated by the numeral 75 in Figures 25 to 30 and as will be seen by reference to these figures it is laid around the form 39, completely encircling the same. The warp threads are omitted from these figures for the sake of clearness, but it will of course be understood that the thread 75 is laid under and over alternate warp threads in the usual manner and as shown, for example, in Fig. 33 of the drawings. The first step in the loop forming operation is shown in Fig. 25 in which the shaft is supposed to be rotating in the direction shown by the arrow. A loop $a$ has just been thrown around the looping hook 150 and the cam 162 is moving with the shaft 12 in the direction of the arrow. As this cam continues to move the cross head 144 and with it the shank 148 and the hook 150 will be gradually lifted until the position shown in 26 is reached. During such lifting movement the loop $a$ has become engaged in the grove 155 of the hook 150 and has been carried by such hook up through the opening 153 to a point beyond the ends of the catches 158. This is shown in Figure 26 wherein the cross head is illustrated as resting upon the highest point $162^a$ of the cam. Further movement of the cam in the direction of the arrow results in slightly lowering the hook 150 and, the catches 158 being swung inwardly into contact with the hook as shown, engage the loop $a$ and pull it upwardly out of the groove 155 up on to the body of the hook. The cross head 144 then drops off of the step or shoulder of the cam 162 and the hook 150 is suddenly projected downwardly, thus slipping through the loop $a$ and extending below the same, as illustrated in Fig. 27. It will be observed that in the position in Figure 25 the shoulders 160 on the catches 158 engage the sides of the shank 148 and the catches are therefore held sufficiently spaced apart to permit the loop $a$ to be drawn up between them. When, however, the position of Figure 26 is approached, the shank 148 is moved up from between the shoulders 160 and the springs 159 have pushed the catches inwardly so as to engage under the loop—or rather one catch engages under the loop while the other is idle.

After the hook has been projected to the position shown in Figure 27, the needle reverses and throws a loop $b$ around the projecting end of the hook. This reversal of the shaft and needle brings the other cam 163 into operation with the result that the hook is slightly drawn upwardly. During such upward movement the catches 158 are spread apart and the loop $b$, resting in the groove 155 is pulled through the loop $a$, as shown in Figure 28, and more in detail in Figure 29. Just before the highest point of the cam is reached in Figure 28, the left hand catch engages under the loop $b$, as shown in Figure 29, and as the hook then begins to descend such catch pulls the loop $b$ up out of the groove 155 on to the shank of the hook, as above described. At this moment the needle is given its axial beating up movement and this results in the fabric moving forward in a direction perpendicular to the plane of the paper in Figure 29 so that as the hook 150 descends it passes to one side of the loop $a$ and carries with it the loop $b$, being projected down into a position which corresponds to that of Figure 25 again.

It will thus be seen that by means of the reciprocating hook 150 in combination with the catches 158 and the oscillating and axial movement of the needle, the loops $a$ and $b$ which are formed from the weft thread at the edges of the fabric at each reversal of the needle are interlinked with each other, as clearly shown in Figure 30. By reference to this figure it will be observed that the loops $a$ and $b$ are passed alternately through each other, thus connecting the two edges of the transverse U-shaped fabric and forming a complete tubular structure. This method of forming a tubular fabric by interlinking the loops of weft thread, as above described, is believed to be broadly new and by this simple method I am enabled to produce continuous tubular fabrics from coarse or heavy thread of any desired material.

The tubular fabric thus woven is progressively fed down along the standard 38 by means of the chain 46 and wheels 15 and 62 above described, as fast as the fabric is formed. Means may be devised for removing this tubular fabric directly from the form or standard 38 in its original condition but in the present instance I have provided means consisting of the cutter disk 61, above described, for cutting or slitting the fabric as it nears the bottom of the standard. Such cut or slit fabric then assumes substantially horseshoe shape and can readily pass off from the standard 38 and be coiled in suitable receivers. The U-shaped fabric thus formed is curved both longitudinally and transversely and lends itself readily to the construction of pneumatic tire casings. The object in linking the loops together, to form a tubular fabric and then splitting the same is for the purpose of facilitating the feeding of the fabric through the machine and for overcoming certain inherent difficulties which are encountered when it is attempted to handle an actual U-shaped fabric throughout the weaving operation.

While I have described the standard or arm 38 for receiving the woven tubular fabric as supported at one end on the base of the machine, so that it is necessary to split such fabric to remove it from the arm, I contemplate, as within the scope of my invention, supporting such arm at its other end by means adjacent to and concentric with the needle. The arm would then be straight, and project horizontally, having its forward end entirely free, whereby the tubular fabric can pass readily off of such free end. This arrangement would be particularly useful where it is desired to preserve the complete tubular structure of the fabric for use in arts other than tire making, as, for example, in the manufacture of sacking.

What I claim is:—

1. The herein described method of producing a tubular woven fabric which consists in supporting warp threads around a curved form, passing a weft thread back and forth across the warp around said form, doubling said weft-thread upon itself at each reversal so as to form loops, and linking such loops together as they are formed.

2. The herein described method of producing a tubular woven fabric which consists in supporting warp threads around a curved form, passing a weft thread back and forth across the warp around said form, doubling said weft-thread upon itself at each reversal so as to form two sets of loops, and connecting said sets of loops.

3. The combination with a curved form, and means for supporting warp threads therearound, of means for passing weft thread back and forth across said warp threads so as to form a loop at each reversal thereof, and means for linking said loops together to produce a tubular fabric.

4. The combination with means for supporting warp threads to define a cylindrical surface, of means for forming a shed, an annular oscillatory needle adapted to enter such shed and lay weft thread therein, and means co-operating with said needle for interlinking the loops of weft thread formed thereby.

5. The combination with means for supporting warp threads so as to define a cylindrical surface and means for producing a shed, of an annular oscillatory needle adapted to enter such shed and lay weft thread back and forth therein, forming a marginal loop at each reversal, and a reciprocating hook co-operating with said needle to link such loops together, as they are formed.

6. The combination with means for supporting warp threads so as to define a cylindrical surface and means for producing a shed, of an annular oscillatory needle adapted to enter such shed and lay weft thread back and forth therein, a hook member around which the weft thread is thrown at each oscillation of the needle to form marginal loops, and means for moving said hook member so as to cause it to link said loops together, as they are formed.

7. The combination with means for supporting warp threads so as to define a cylindrical surface and means for producing a shed, of an annular oscillatory needle adapted to enter such shed and lay weft thread back and forth therein, a hook member around which the weft thread is thrown at each oscillation of the needle to form marginal loops, said hook retaining a pair of opposed loops at once, and means for causing said hook to draw one of said loops through the other.

8. The combination with means for supporting warp threads and for forming a circular shed, of an annular oscillatory needle adapted to enter such shed and lay weft thread therein, the body of said needle extending for more than 360 degrees, whereby the point overlaps the heel thereof.

9. The combination with means for supporting warp threads and for forming a circular shed, of an annular oscillatory needle adapted to enter such shed and lay weft thread therein, the point of said needle overlapping the heel thereof, and spaced therefrom in substantially spiral relation.

10. In a circular loom, a needle comprising a radial supporting arm and an annular body extending more than 360 degrees, whereby the point overlaps the heel thereof.

11. In a circular loom, a needle comprising a radial supporting arm and an annular body, the point overlapping the heel thereof, and spaced therefrom.

12. In a circular loom, a needle comprising a radial supporting arm and a relatively thin and wide annular body, said body having thread guiding means disposed around one edge thereof.

13. The combination with means for supporting warp threads and for forming a circular shed, of an annular oscillatory needle adapted to enter such shed and lay weft thread therein, said needle being relatively thin and wide in cross-section, and having thread guiding means extending around the rear edge thereof.

14. The combination with means for supporting warp threads and for forming a circular shed, of an annular oscillatory needle adapted to enter such shed and lay weft thread therein, said needle being relatively thin and flat in cross-section, and having a peripheral thread receiving groove formed in the edge thereof.

15. In a device of the character described, an annular weft needle, and a shaft on which said needle is supported, said shaft having a central bore through which weft thread is led to said needle.

16. In a device of the character described, an annular weft needle, a shaft on which said needle is supported, said shaft having a central bore through which the weft thread is led, and a guide for delivering such thread from said bore to the periphery of said needle.

17. In a machine of the character described, an annular weft needle, and a shaft on which said needle is supported, said shaft being formed of two axially separable sections, and the needle being rigidly secured to one of said sections, whereby, when said shaft is separated, the needle with its attached section, may be disconnected from the other section.

18. The combination with means for supporting warp threads and for forming a cylindrical shed, of an annular oscillatory needle adapted to lay weft thread in such shed, and means for moving said needle axially positively in both directions to beat up the thread.

19. The combination with means for supporting warp threads and for forming a cylindrical shed, of an annular oscillatory needle adapted to lay weft thread in such shed, a shaft for oscillating said needle, a reciprocatory sleeve surrounding said shaft, and serving to move the needle axially to beat up the thread, and a fixed bearing in which said shaft is journaled at a point intermediate the ends of said sleeve.

20. The combination with means for supporting warp threads and for forming a shed, of a needle adapted to travel transversely of the warp and serving to lay weft thread in the shed, means for moving the needle forwardly parallel to the warp to beat up the weft thread, a tension device for the warp threads, and means for moving said tension device simultaneously with the needle but in the opposite direction, parallel with the warp threads.

21. The combination with means for supporting warp threads around the arc of a circle and for forming a shed, of a needle adapted to travel transversely of the warp and serving to lay weft thread in the shed, means for moving the needle forwardly parallel to the warp to beat up the weft thread, a series of tension devices for the warp threads disposed around the arc of a circle, and means for moving said tension devices simultaneously with the needle, but in the opposite direction, parallel with the warp threads, such means being constructed to move those tension devices at one portion of the arc to a greater extent than those at another portion thereof.

22. The combination with means for supporting warp threads around the arc of a circle and for forming a shed, of a needle adapted to travel transversely of the warp and serving to lay weft thread in the shed, means for moving the needle forwardly parallel to the warp to beat up the weft thread, a series of tension devices for the warp threads also disposed around the arc of a circle, each of said devices comprising a pivotally supported radially extending lever, and a plate movable with the needle, and adapted to engage the inner ends of said levers to move the said tension devices simultaneously with the needle, said plate being disposed at an angle to the axis of said arc-shaped series of tension devices.

23. The combination with means for supporting warp threads and for forming a shed, of a needle adapted to travel transversely of the warp and serving to lay weft thread in the shed, means for moving the needle forwardly parallel to the warp to beat up the weft thread, and means for exerting a backward pull on the warp threads at the moment that the needle moves forwardly, as described.

24. In a loom, means for supporting warp threads so as to define the surface of a cylinder, and means for laying weft thread therearound, in combination with a circular heddle mechanism formed in two separable sections, and means for moving said sections apart so as to divide the warp.

25. In a loom, means for supporting warp threads so as to define the surface of a cylinder, and an annular needle for laying weft thread therearound, in combination with a circular heddle mechanism, formed in two separable sections, and means for moving said sections apart to divide the warp, so as to afford access to said needle.

26. In a loom, the combination with a circular heddle and tension devices for the warp threads, of an annular weft needle mounted concentrically therewith, both the heddle and tension devices being formed of a pair of separable sections, and means for moving such sections apart to divide the warp, so as to afford access to said needle.

27. In a loom, the combination with circular heddle and tension devices for the warp threads, of an annular weft needle mounted concentrically therewith, both the heddle and tension devices being formed of a pair of separable sections, and means for simultaneously moving the sections of both said devices apart to divide the warp, so as to afford access to said needle.

28. In a loom, the combination with a circular heddle and tension devices for the warp threads, of an annular weft needle mounted concentrically therewith, both the heddle and tension devices being formed of a pair of separable sections, and means for simultaneously moving the sections of both said devices apart to divide the warp, so as to afford access to said needle, all of said sections being movable in arc-shaped paths having a common center.

29. In a loom, a circular heddle mechanism comprising an inner ring having openings, a series of radially disposed heddle rods having their inner ends freely slidable through the openings in said ring, and means rigidly secured to the outer ends of said rods for operating them.

30. In a loom, a heddle mechanism comprising two circular series of radially extending rods disposed in different planes, and means operating upon the outer ends of said rods for simultaneously shifting all of the rods of each series.

31. In a loom, a circular tension mechanism comprising an annular frame, a series of radially disposed levers pivotally mounted on said frame, and a group of tension devices carried by each lever.

32. In a loom, a tension mechanism comprising a pivoted bracket, a rod supported thereby, a series of pairs of discs having convex faces carried on said rod, and means for resiliently urging said discs together.

33. The combination with a ring, and means for supporting warp threads therearound, of means for laying weft thread across the warp to form a tubular fabric, and a fixed arc-shaped standard over which such fabric is received, said ring being mounted on said standard.

34. The combination with a curved arc-shaped standard supported at one end, means for supporting warp threads around the other end of said standard, means for laying weft threads back and forth across the warp to form a tubular fabric, and means for feeding the fabric along said standard, as it is woven.

35. In a loom for weaving curved fabrics, the combination with means for forming a circular shed and for laying weft threads therein, of a fixed form for receiving the woven fabric, said form corresponding in cross-section to the shape of the fabric, and comprising a central supporting frame and a pair of curved sections carried thereby.

36. In a loom for weaving curved fabrics, the combination with means for forming a circular shed and for laying weft threads therein, of a fixed form for receiving the woven fabric, said form being arcuate longitudinally, and comprising a central supporting frame and a pair of curved sections secured thereto and together conforming to the shape of the fabric, and means for feeding the fabric along the form as it is woven.

37. The combination with a ring, and means for supporting warp threads therearound, of means for laying weft thread across the warp to form a tubular fabric, a fixed standard over which said fabric is received, said standard carrying said ring, an endless chain extending lengthwise of said standard and having means to engage the fabric, and means for driving said chain so as to cause it to feed the fabric along the standard.

38. The combination with a fixed curved standard, and means for supporting warp threads therearound, of means for laying weft thread across the warp to form a tubular fabric, means for feeding the fabric along the standard as it is formed, and means for splitting the fabric so that it may pass off from said standard.

39. The combination with an elongated supporting structure, of means for forming a tubular fabric therearound, and means for feeding such fabric along said structure as it is formed, said means comprising a traveling flexible element moving longitudinally of the said structure, and having fabric engaging projections extending beyond the surface thereof, and means for positively driving said element.

40. The combination with an elongated supporting structure, of means for forming a tubular fabric therearound, and means for feeding such fabric along said structure as it is formed, said means comprising an endless flexible element mounted with one run inside said supporting structure, and one run extending longitudinally thereof adjacent and parallel with the outer surface of said structure, and means for driving said flexible element.

41. The combination with an arcuate supporting structure, of means for forming a tubular fabric thereon, and means for feeding such fabric along said structure as it is formed, said means comprising a flexible element traveling longitudinally of the outer periphery of the said arcuate structure.

42. The combination with an elongated structure or standard curved longitudinally and supported at one end only, of means for forming a tubular fabric around the other end thereof, and means for feeding the finished fabric along said structure or standard as it is formed.

43. The combination with an arcuate supporting structure, of means for forming a tubular fabric thereon, and means for feeding the finished fabric along said supporting structure as it is formed, said means comprising movable elements engaging the fabric at both the outer and inner peripheries of said arcuate structure.

In testimony whereof I affix my signature.

EMANUEL INGHAM.